(No Model.)
J. H. CROSKEY & J. LOCKE.
WIRE GLASS AND PROCESS OF MANUFACTURING SAME.
No. 548,520.              Patented Oct. 22, 1895.
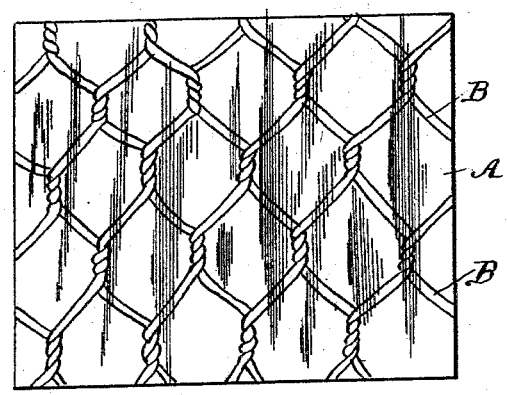
WITNESSES:
John H. Croskey
Joseph Locke
INVENTORS
BY Connolly Bros
ATTORNEYS.

UNITED STATES PATENT OFFICE.

JOHN H. CROSKEY AND JOSEPH LOCKE, OF PITTSBURG, PENNSYLVANIA.

WIRE-GLASS AND PROCESS OF MANUFACTURING SAME.

SPECIFICATION forming part of Letters Patent No. 548,520, dated October 22, 1895.

Application filed April 2, 1895. Serial No. 544,188. (No model.)

*To all whom it may concern:*

Be it known that we, JOHN H. CROSKEY and JOSEPH LOCKE, citizens of the United States, residing at Pittsburg, in the county of Allegheny and State of Pennsylvania, have invented certain new and useful Improvements in Wire-Glass and Processes of Manufacturing the Same; and we do hereby declare the following to be a full, clear, and exact description of the invention, such as will enable others skilled in the art to which it appertains to make and use the same.

Our invention has relation to the manufacture of wire-glass, and has for its object the provision of a novel method of manufacturing that class of wire-glass in which the wire previously to its introduction into the glass is insulated, covered, or coated with a material which will prevent the deleterious effects which follow when the heated glass is brought into direct contact with the wire; and our invention consists in the novel process or method of manufacturing wire-glass hereinafter described and in the new article of manufacture resulting therefrom.

In carrying our invention into effect we cover, coat, or inclose the wire in a suitable insulating material, preferably a substantially non-combustible mineral, such as asbestos, and in order to prevent the evolution of the gases or vapors from the coating while the coated wire is being embedded or inclosed in the glass we submit the coating or covering of the wire to the action of heat previous to the inclusion of the same in the glass, so as to drive off such gases or vapors, and we then inclose the wire in molten glass, thereby producing wire-glass of a superior quality, free from bubbles or defects and of great strength and homogeneity.

The single figure of the accompanying drawing illustrates a sheet or plate of wire-glass made according to our invention, A designating the glass, and B B the covered wires.

Where the material used for coating or insulating the wires is a mineral substance capable of being spun into threads, such as asbestos, we wrap or plait the thread upon the wire and then submit the covered wire to the action of a degree of heat sufficient to expel the gases or vapors from the mineral, and then inclose the coated wire in glass in any of the well-known processes.

We have found by experience that much of the asbestos used for commercial purposes contains a great deal of water in chemical combination and that under the heating influence of the molten glass this water is expelled in the form of steam or vapor, which tends to produce bubbles and imperfections in the glass, and thus renders the glass unfit for use or greatly injures it. We have found, however, that by submitting the asbestos to a high degree of heat previous to its inclosure in the glass the water and other vaporizable constituents will be expelled, and consequently no further vapors or gases will be generated by the heat of the glass. In practice we have obtained the best results by heating the coated wire until the coating had become white hot and allowing it to remain at this heat until all the gases and vapors had been expelled.

A convenient method of heating the covered wire for the purpose of devaporizing the same previously to covering it with the glass to form the completed sheet or section is to insert the covered wire in the glass-furnace and hold it there until all or substantially all the elements vaporizable at the temperature of molten glass have been eliminated.

It is to be noticed that the devaporization of the covering of the wire is accomplished before the wire is brought into contact with the glass, and by this means the evolution of vapor and the consequent formation of bubbles or cavities in the glass are avoided.

Having described our invention, we claim—

1. The process of manufacturing wire glass consisting in coating or covering the wire with an insulating material, expelling the gas or vapor from such material and then inclosing the covered wire in glass.

2. The process of manufacturing wire glass consisting in coating or covering the wire with a non-combustible mineral, heating the mineral and expelling the gas or vapor which may be generated, and finally coating the wire with glass.

3. The process of manufacturing wire glass, consisting in covering the wire with asbestos, heating the asbestos and expelling the gas or vapor generated by the heat, and finally coating the asbestos covered wire with molten glass.

4. As a new article of manufacture wire glass, that is sheets or sections of glass inclosing strands of wire, the said wire being incased or enveloped in an incombustible and infusible devaporized material, substantially as described.

5. As a new article of manufacture wire glass having the wire incased or enveloped in an incombustible and infusible material devoid of vaporizable elements.

In testimony whereof we have affixed our signatures in presence of two witnesses.

JOHN H. CROSKEY.
JOSEPH LOCKE.

Witnesses:
JAMES SHEWAN,
C. E. SUCCOP.